(12) United States Patent
Schneider

(10) Patent No.: US 7,048,297 B2
(45) Date of Patent: May 23, 2006

(54) GAS BAG MODULE

(75) Inventor: Michael Schneider, Niedernberg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/677,045

(22) Filed: Oct. 1, 2003

(65) Prior Publication Data

US 2004/0061315 A1    Apr. 1, 2004

(30) Foreign Application Priority Data

Oct. 1, 2002    (DE) .................. 202 15 115 U

(51) Int. Cl.
*B60R 21/20*    (2006.01)

(52) U.S. Cl. .................. 280/728.2; 280/728.3; 280/731; 280/732

(58) Field of Classification Search ............. 280/727, 280/728.1, 728.2, 728.3, 740, 741, 731, 732
See application file for complete search history.

(56) References Cited

U.S. PATENT DOCUMENTS

| | | | | |
|---|---|---|---|---|
| 5,277,442 A | * | 1/1994 | Cuevas | 280/731 |
| 5,388,858 A | * | 2/1995 | Cuevas | 280/728.2 |
| 5,409,256 A |   | 4/1995 | Gordon et al. | |
| 5,496,057 A | * | 3/1996 | Niederman | 280/728.2 |
| 5,564,732 A | * | 10/1996 | Bauer et al. | 280/728.3 |
| 5,639,111 A | * | 6/1997 | Spencer et al. | 280/728.2 |
| 5,782,481 A | * | 7/1998 | Magoteaux | 280/728.2 |
| 5,791,682 A |   | 8/1998 | Hiramitsu et al. | |
| 6,325,407 B1 | * | 12/2001 | Soderquist | 280/728.2 |
| 6,328,332 B1 | * | 12/2001 | Schutz | 280/728.2 |
| 6,367,835 B1 | * | 4/2002 | Maguire | 280/728.2 |
| 6,702,319 B1 | * | 3/2004 | Sczeburek et al. | 280/728.3 |
| 6,752,415 B1 | * | 6/2004 | Nelson et al. | 280/728.2 |

FOREIGN PATENT DOCUMENTS

| | | |
|---|---|---|
| EP | 0671299 | 9/1995 |
| EP | 0738630 | 10/1996 |
| JP | 08058510 | 3/1996 |
| JP | 2000 016225 | 1/2000 |
| JP | 2002 137742 | 5/2002 |

* cited by examiner

*Primary Examiner*—Paul N. Dickson
*Assistant Examiner*—Toan C. To
(74) *Attorney, Agent, or Firm*—Tarolli, Sundheim, Covell & Tummino L.L.P.

(57) ABSTRACT

A gas bag module comprises a module housing (12) and a covering cap (14), a side wall (15) being provided on at least one of the module housing (12) and the covering cap (14). An outer wall (16) of the covering cap defines a front side of the module and an outer wall (18) of the module housing (12) defines a rear side of the module, whereby an outlet direction (R) is given that runs from the rear side to the front side of the module. The module housing (12) has first fastening elements (20) and the covering cap (14) has second fastening elements (22) which can be brought into engagement with the first fastening elements. The first and second fastening elements (20, 22) are arranged and aligned with respect to the side wall (15) such that the engagement of the first and second fastening elements (20, 22), which prevents an uncoupling of the covering cap (14) and of the module housing (12) in a gas bag outlet direction (R), comes about through a movement of the fastening elements (20, 22) relative to each other in a direction (E) that runs along the side wall (15) and transversely to the outlet direction (R).

6 Claims, 2 Drawing Sheets

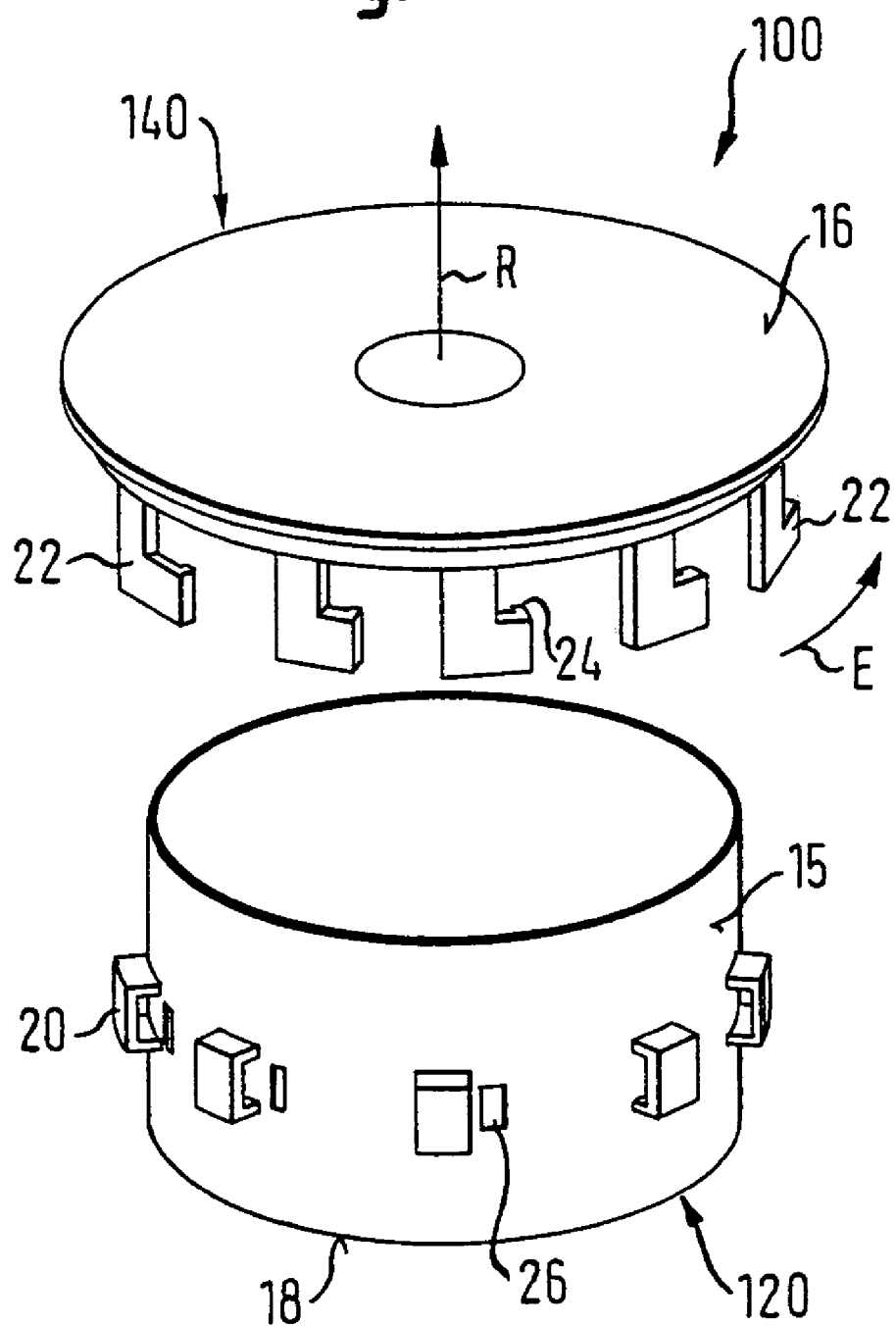

GAS BAG MODULE

TECHNICAL FIELD

The invention relates to a gas bag module comprising a module housing and a covering cap.

BACKGROUND OF THE INVENTION

Conventional gas bag modules have a side wall provided on the module housing and/or on the covering cap; an outer wall of the covering cap defines a front face of the module and an outer wall of the module housing defines a rear face of the module, whereby an outlet direction is given that runs from the rear face to the front face of the module. The module housing has first fastening elements and the covering cap has second fastening elements which can be brought into engagement with the first fastening elements.

U.S. Pat. No. 5,409,256 shows a gas bag module in which a covering cap receives a gas bag and has downwardly projecting insert tabs which snap into place in openings of an annular carrier plate of the gas bag module. Assembling the covering cap and the carrier plate takes place with a relative movement between these two parts in a direction which corresponds to the outlet direction of the gas bag.

U.S. Pat. No. 5,791,682 shows a gas bag module comprising a carrier plate and a covering cap which has front and side walls and is to be mounted to the carrier plate. The carrier plate has a circumferential wall comprising elastic latching tabs that are bent outwards. These tabs engage in openings in the side wall when the covering cap is slipped on the carrier plate. The relative movement between covering cap and carrier plate during assembly lies in a direction which is the outlet direction of the gas bag.

The covering cap represents the component which closes off the gas bag module to the exterior, for example with respect to an interior of a vehicle. On activation of the gas bag module, the covering cap is opened in a controlled manner, mostly by the gas bag itself. Here, it is important that the high forces exerted on opening of the covering cap or on emergence of the gas bag do not release the connection between the covering cap and the gas bag module. As already discussed above, it is known to fasten the covering cap to the gas bag module by means of latching connections, which has the advantage that the covering cap merely has to be inserted into or attached onto the module housing, until the latching elements snap into each other. In order to secure the latching connection, however, generally additional securing elements are necessary which can withstand the high forces occurring; this increases the number of components and also the time required for installation.

The invention provides a gas bag module in which a secure connection is achieved between the cap and the module housing in a simple manner.

BRIEF SUMMARY OF THE INVENTION

According to the invention, a gas bag module comprises a module housing and a covering cap, a side wall being provided on at least one of the module housing and the covering cap. An outer wall of the covering cap defines a front side of the module and an outer wall of the module housing defines a rear side of the module, whereby an outlet direction is given that runs from the rear side to the front side of the module. The module housing has first fastening elements and the covering cap has second fastening elements which can be brought into engagement with the first fastening elements. The first and second fastening elements are arranged and aligned with respect to the side wall such that the engagement of the first and second fastening elements, which prevents an uncoupling of the covering cap and of the module housing in a gas bag outlet direction, comes about through a movement of the fastening elements relative to each other in a direction that runs along the side wall and transversely to the outlet direction and not in or against the outlet direction.

The term "outlet direction" substantially means the direction in which the gas bag emerges from the module. It also corresponds to the direction in which the emerging gas bag exerts a force from the inner face of the module onto the covering cap, i.e. in general terms, represents a direction in which high forces act on the connection between the covering cap and the module housing. According to the invention, the insertion direction along which the fastening elements are moved for engaging each other and which usually represents the direction in which the connection is detachable with the smallest force, lies perpendicular to this direction of highest force loading. The first and second fastening elements are able to be optimized in their construction by a specialist in the art in a simple manner with regard to the respective requirements, so that the fastening can withstand a high force in the outlet direction, i.e. perpendicular to the insertion direction. The described type of fastening of the covering cap and module housing to each other is also not susceptible to dynamic effects as may act on the connection of the fastening elements on emergence of the gas bag.

In contrast to known latching connections used for the connection of covering cap and gas bag module, the engagement of the fastening elements does not take place by a deflection of the elements perpendicular to a side wall, but rather by a movement of the fastening elements along a side wall so that the latching connection is unsusceptible to detachment on deformation of the side wall.

The engagement of the first and second fastening elements is brought about in a preferred embodiment by a translational, relative movement between the covering cap as a whole and the module housing as a whole, the movement occurring along the side wall and transversely to the outlet direction.

In another preferred embodiment, the engagement of the first and second fastening elements comes about through a rotary, relative movement between the covering cap as a whole and the module housing as a whole. In this case, too, the insertion direction of the fastening elements lies substantially perpendicular to the outlet direction of the gas bag, so that the high forces can be taken up by the fastening elements in a direction which is perpendicular to the weakest direction of the connection.

The rotary movement preferably takes place in a plane which is substantially perpendicular to the outlet direction.

In this embodiment, the first and second fastening elements preferably form a bayonet closure. The bayonet closure can be constructed at the discretion of the specialist in the art in accordance with the respective requirements.

In both embodiments, preferably at least one group of fastening elements is arranged on a side wall. The other fastening elements then move along the side wall on which the group of fastening elements is arranged, until the first and second fastening elements come into engagement. The fastening elements may, for example, be integrally formed on the side wall.

In a preferred embodiment of the invention, the first fastening elements are constructed in the form of straps and the second fastening elements are constructed in the form of hooks. This form of fastening elements can be produced with minimal expenditure, e.g. by an injection-molding process, and offers a secure fastening which makes possible an easy movement of the fastening elements with respect to each other in the insertion direction and, at the same time, permits a high take-up of force perpendicular to the insertion direction by the fastening elements.

On the covering cap and on the module housing, in addition to the first and second fastening elements, securing latching elements can be provided by means of which, when the first and second fastening elements are in engagement with each other, an additional securing latching connection is formed through which the covering cap is secured on the module housing. Hereby, an unintentional detachment of the covering cap from the module housing, e.g. by shaking loose due to vehicle vibrations, can be prevented.

The securing latching connection is preferably established by a relative movement of the securing latching elements in a direction substantially perpendicular to the movement along the side wall, the closing movement preferably also taking place perpendicular to the outlet direction, i.e. for example towards the side wall.

The additional securing latching connection may, for example, be realized by depressions formed on the module housing and by projections formed on the second fastening elements, so that the securing latching connection is closed in the same operating step, in which the first and second fastening elements are brought into engagement with each other.

BRIEF DESCRIPTION OF THE DRAWINGS

FIG. 5 shows a diagrammatic perspective view of a gas bag module according to the invention, in accordance with a second embodiment.

DETAILED DESCRIPTION OF THE PREFERRED EMBODIMENTS

Figure 1:
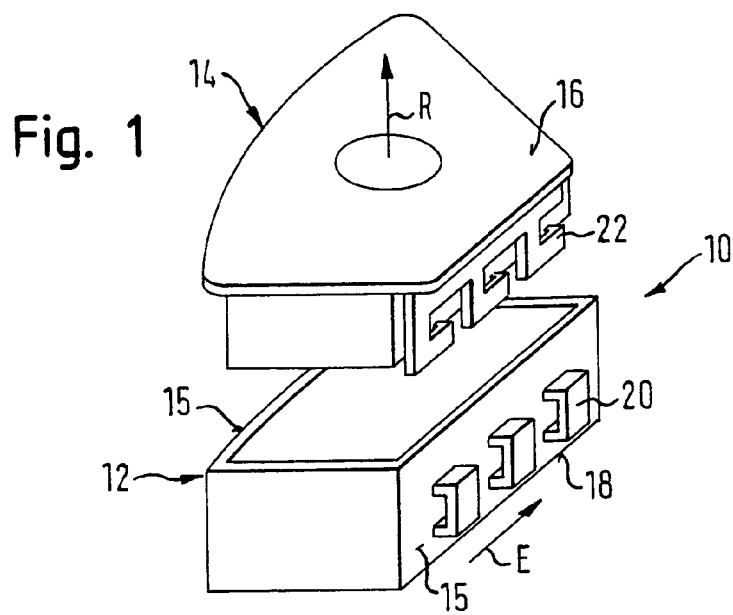
FIG. 1 shows a diagrammatic perspective view of a gas bag module according to the invention, in accordance with a first embodiment.

The gas bag module 10 according to a first embodiment, shown in FIG. 1, has a module housing 12 and a covering cap 14 separate therefrom.

Both the covering cap 14 and also the module housing 12 in the examples shown here consist of a suitable plastic material, but other materials may also be provided.

The module housing 12 shown here is a self-contained component. However, it could also be a part of a steering wheel or another part of a vehicle body, on which the covering for a gas bag or a gas bag module is arranged. A gas bag, not shown here, is accommodated in the module housing 12.

The gas bag module 10 has a module front side 16 and a module rear side 18, which lie substantially opposite each other. The front side 16 of the gas bag module 10 is defined by an outer wall of the covering cap 14 and the module rear side 18 is defined by an outer side of the module housing 12. The direction running from the module rear side 18 to the module front side 16 represents substantially an outlet direction R of the gas bag, arranged in the module, on an activation of the gas bag module. On emergence of the gas bag in direction R, the covering cap 14 can open at predetermined locations; however, in so doing, it will not be detached from the module housing 12.

To fasten the covering cap 14 to the module housing 12, first fastening elements 20 are formed on the module housing 12 on a side wall 15, whilst the covering cap 14 has second fastening elements 22 complementary thereto.

The first fastening elements 20 in the example shown here are realized by straps, whereas the second fastening elements 22 are constructed in the form of hooks. The straps of the first fastening elements 20 are constructed in a U-shape, the arms of the "U" each being fastened to a wall of the module housing 12, so that the strap with the side wall 15 of the module housing 12 forms an open channel through which the hook of a second fastening element 22 can engage in each case.

Figure 2:
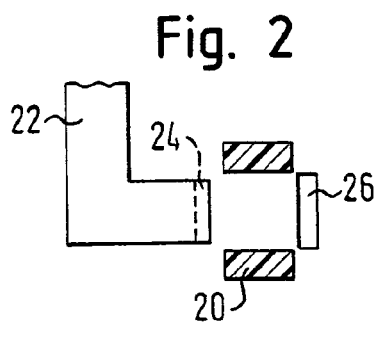
FIG. 2 shows a sectional view of the fastening elements of the gas bag module of FIG. 1, in a state in which the fastening elements are not in engagement with each other.
Figure 3:
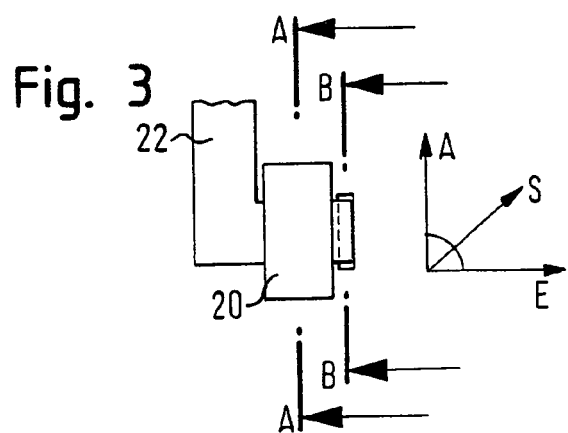
FIG. 3 shows a sectional view of the fastening elements of FIG. 1 in a state in which the fastening elements are in engagement with each other.
Figure 4:
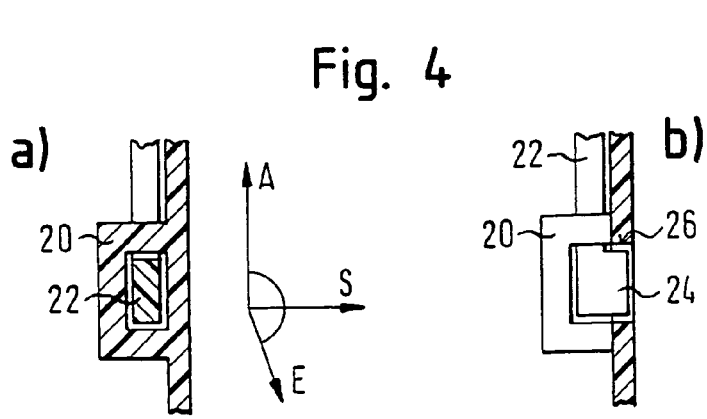
FIG. 4a and FIG. 4b show sectional views along the lines A—A and B—B of FIG. 3, respectively.

To fasten the covering cap 14 to the module housing 12, the first and second fastening elements 20 and 22 are pushed into each other by a translational movement along the side wall 15 in an insertion direction E lying perpendicular to the direction R, so that the hooks engage into the straps (FIGS. 2 to 4). For this, the covering cap 14 and the module housing 12 are each moved as a whole relative to each other.

The outlet direction R represents the main loading direction of the connection 20, 22. As this main loading direction lies perpendicular to the insertion direction E, in which the connection 20, 22 is brought about, the connection of the first and second fastening elements 20, 22 is not exposed to any high forces in the insertion direction. In the outlet direction R, the hooks and straps of the fastening elements 20, 22 can easily withstand the high forces which occur.

As is shown in FIGS. 2 to 4, in the example embodiment which is shown, additional securing latching elements are provided, the latching connection of which prevents an unintentional detachment of the connection of the first and second fastening elements 20, 22 in the insertion direction. For this, projections 24 directed towards the interior of the covering cap 14 are formed on the tip of the hooks of the second fastening elements 22, whilst in the side wall 15 of the module housing 12, as viewed in insertion direction E, depressions 26 are formed directly behind the straps of the first fastening elements 20. On insertion of the second fastening elements 22 into the first fastening elements 20, firstly the hooks engage into the straps. When the second fastening elements 22 are pushed completely into the straps of the first fastening elements 20, the projections 24 engage into the depressions 26 in a direction S both perpendicular to the insertion direction E and also to the outlet direction R and thus secure the connection 20, 22 in terms of a movement contrary to the engagement direction E (see FIGS. 3 and 4b).

The additional securing latching connection 24, 26 does not need to withstand any high forces. For example, it serves to prevent a detachment of the fastening elements 20, 22 by vehicle vibrations. The high forces which occur on emergence of the gas bag in direction R, are principally received by the hooks and straps of the first and second fastening elements 20, 22, as can be seen in FIG. 4a and FIG. 3.

FIG. 5 shows a second embodiment of the invention, in which the covering cap 140 of the gas bag module 100 and also the module housing 120 are constructed in cylindrical shape and the first and second fastening elements 20, 22 engage into each other in the form of a bayonet closure. The design of the fastening elements 20, 22 corresponds to the one described in connection with the first embodiment.

As in the first embodiment, the insertion direction E here also lies perpendicular to the outlet direction R of the gas bag, which in turn coincides with the direction which runs from the rear side 18 to the front side 16 of the gas bag module 100.

Here, likewise, additional securing latching elements are provided in the form of projections 24 and depressions 26, which are constructed in an analogous manner to those of the first embodiment.

Of course, the type and form of the fastening elements and securing latching elements can be varied at the discretion of the specialist in the art. It is essential that the fastening elements are constructed such that they can receive high forces in a direction perpendicular to the insertion direction, which corresponds substantially to the outlet direction of the gas bag, whilst they are easily movable with respect to each other in the insertion direction, for the production of the connections.

The design of the additional securing latching connection is also not limited to the one described here.

It is also conceivable to provide developments of the first and second fastening elements in which additional latching connections can be dispensed with.

What is claimed is:

1. A gas bag module comprising a module housing (12) and a covering cap (14), a side wall (15) on at least one of said module housing (12) and said covering cap (14),
   an outer wall (16) of said covering cap defining a front side of said module and an outer wall (18) of said module housing (12) defining a rear side of said module, whereby an outlet direction (R) is given that runs from said rear side to said front side of said module,
   said module housing (12) having first fastening elements (20) and said covering cap (14) having second fastening elements (22) which can be brought into engagement with said first fastening elements,
   characterized in that said first and second fastening elements (20, 22) are arranged and aligned with respect to said side wall (15) such that an engagement of said first and second fastening elements (20, 22), which prevents an uncoupling of said covering cap (14) and of said module housing (12) in a gas bag outlet direction (R), comes about through a movement of said fastening elements (20, 22) relative to each other in a direction (E) that runs along said side wall (15) and transversely to said outlet direction (R), and said engagement of said first and second fastening elements (20, 22) comes about through a rotary, relative movement between said covering cap (14) as a whole and said module housing (12) as a whole.

2. A gas bag module comprising a module housing (12) and a covering cap (14), a side wall (15) on at least one of said module housing (12) and said covering cap (14),
   an outer wall (16) of said covering cap defining a front side of said module and an outer wall (18) of said module housing (12) defining a rear side of said module, whereby an outlet direction (R) is given that runs from said rear side to said front side of said module,
   said module housing (12) having first fastening elements (20) and said covering cap (14) having second fastening elements (22) which can be brought into engagement with said first fastening elements,
   characterized in that said first and second fastening elements (20, 22) are arranged and aligned with respect to said side wall (15) such that an engagement of said first and second fastening elements (20, 22), which prevents an uncoupling of said covering cap (14) and of said module housing (12) in a gas bag outlet direction (R), comes about through a movement of said fastening elements (20, 22) relative to each other in a direction (E) that runs along said side wall (15) and transversely to said outlet direction (R), and said first fastening elements (20) are constructed in the form of straps and said second fastening elements (22) are constructed in the form of hooks, each of said straps being constructed in a U-shape and including a plurality of arms, each of said arms being fastened to said side wall so that each of said straps in combination with said side wall of said housing forms a channel through which a said hook engages.

3. A gas bag module comprising a module housing (12) and a covering cap (14), a side wall (15) on at least one of said module housing (12) and said covering cap (14),
   an outer wall (16) of said covering cap defining a front side of said module and an outer wall (18) of said module housing (12) defining a rear side of said module, whereby an outlet direction (R) is given that runs from said rear side to said front side of said module,
   said module housing (12) having first fastening elements (20) and said covering cap (14) having second fastening elements (22) which can be brought into engagement with said first fastening elements,
   characterized in that said first and second fastening elements (20, 22) are arranged and aligned with respect to said side wall (15) such that an engagement of said first and second fastening elements (20, 22), which prevents an uncoupling of said covering cap (14) and of said module housing (12) in a gas bag outlet direction (R), comes about through a movement of said fastening elements (20, 22) relative to each other in a direction (E) that runs along said side wall (15) and transversely to said outlet direction (R), and on said covering cap (14; 140) and on said module housing (12; 120), in addition to said first and second fastening elements (20, 22), securing latching elements are provided by which, when said first and second fastening elements (20, 22) are in engagement with each other, a securing latching connection (24, 26) is formed through which said covering cap (14; 140) is secured on said module housing (12; 120).

4. The gas bag module according to claim 3, characterized in that said securing latching connection (24, 26) is realized by depressions (26) formed on said module housing (12; 120) and by projections (24) formed on said second fastening elements (22).

5. The gas bag module according to claim 3, characterized in that said securing latching connection (24, 26) is established by a relative movement of said securing latching elements in a direction substantially perpendicular to said side wall (15) and to said outlet direction (R).

6. A gas bag module comprising a module housing (12) and a covering cap (14), a side wall (15) on at least one of said module housing (12) and said covering cap (14),
   an outer wall (16) of said covering cap defining a front side of said module and an outer wall (18) of said module housing (12) defining a rear side of said module, whereby an outlet direction (R) is given that runs from said rear side to said front side of said module,
   said module housing (12) having first fastening elements (20) and said covering cap (14) having second fastening elements (22) which can be brought into engagement with said first fastening elements, characterized in that said first and second fastening elements (20, 22) are arranged and aligned with respect to said side wall (15) such that an engagement of said first and second fastening elements (20, 22), which prevents an uncoupling of said covering cap (14) and of said module housing (12) in a gas bag outlet direction (R), comes about through a movement of said fastening elements (20, 22) relative to each other in a direction (E) that runs along said side wall (15) and transversely to said outlet direction (R), and said first fastening elements (20) are constructed in the form of straps and said second fastening elements (22) are constructed in the form of hooks, wherein said hooks cooperate with depressions (26) to resist rotation in the E direction.

\* \* \* \* \*